Jan. 3, 1928.
A. B. CLISSON
1,655,134
FRUIT AND VEGETABLE PACKING APPARATUS
Filed Dec. 24, 1925 2 Sheets-Sheet 1
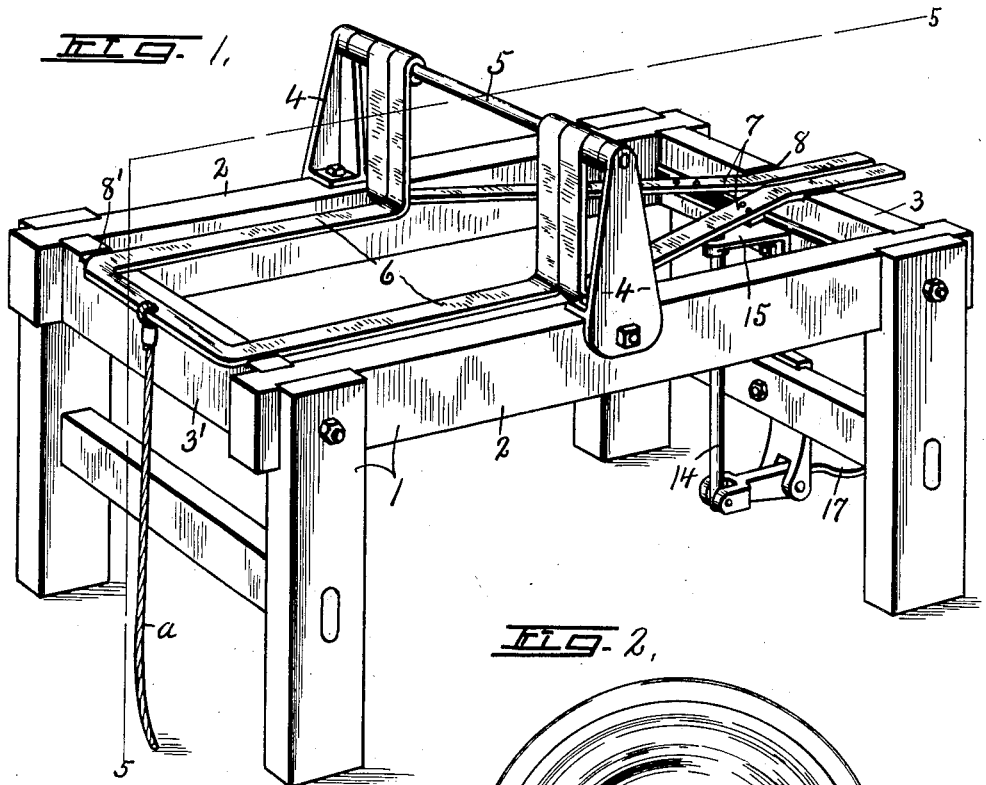
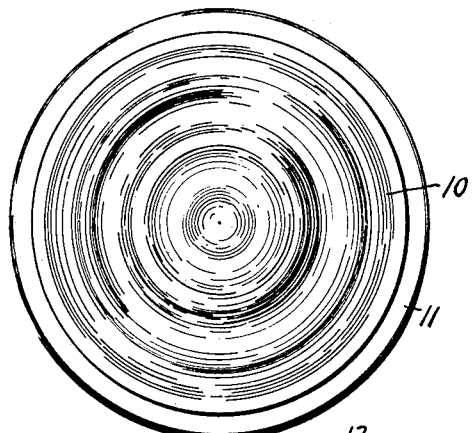
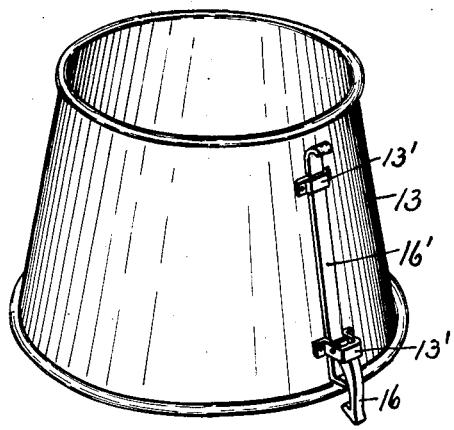
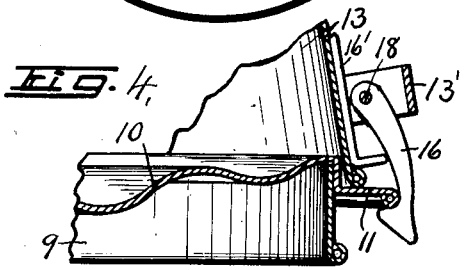

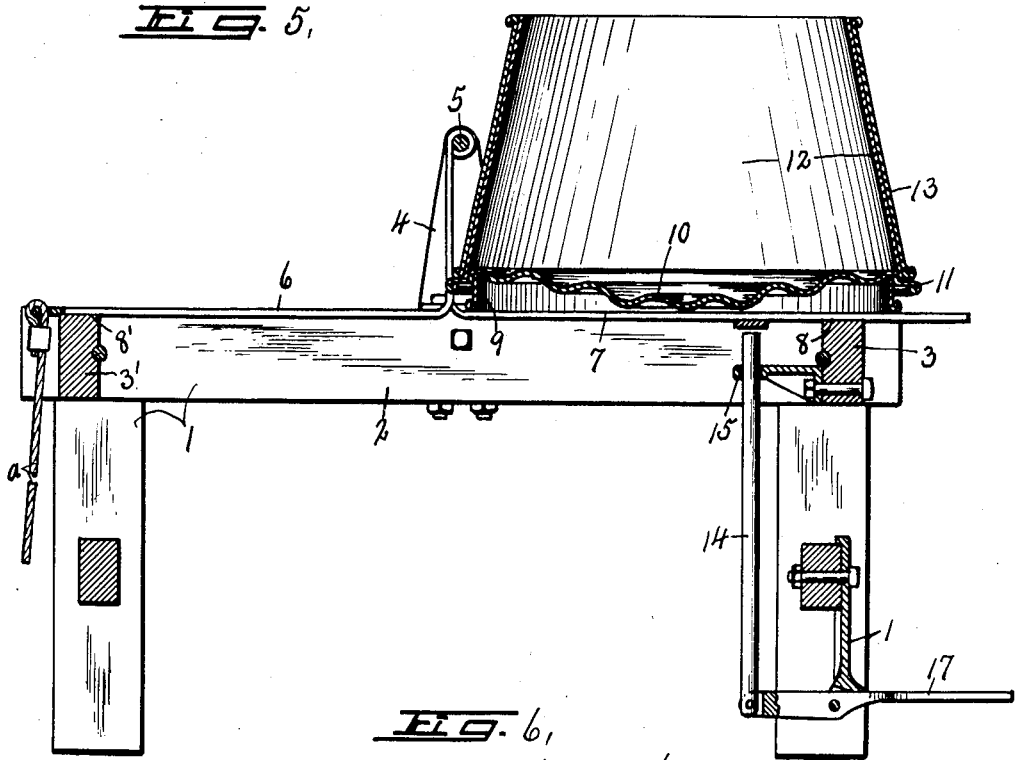
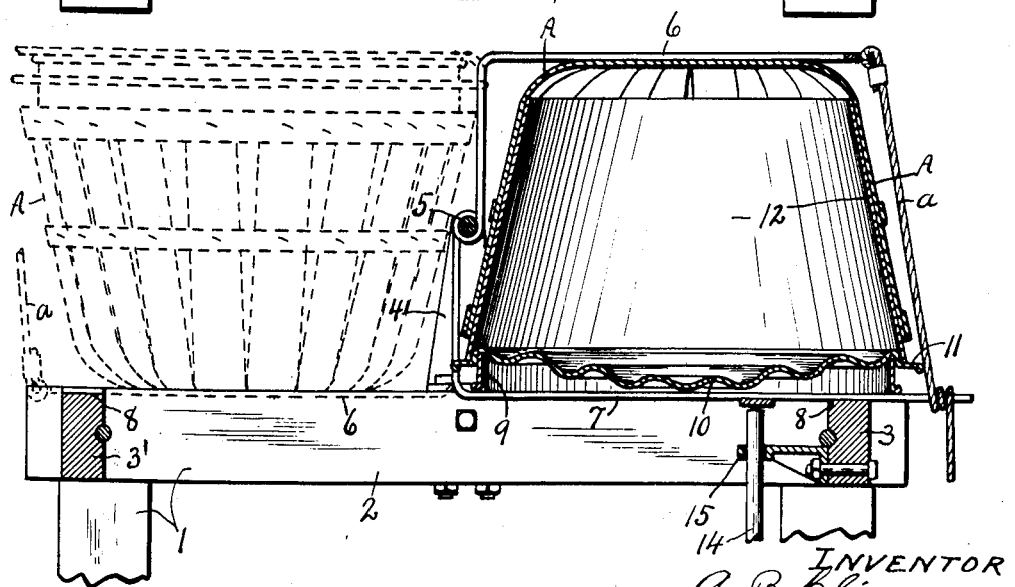

Patented Jan. 3, 1928.

1,655,134

UNITED STATES PATENT OFFICE.

ALBERT B. CLISSON, OF SYRACUSE, NEW YORK.

FRUIT AND VEGETABLE PACKING APPARATUS.

Application filed December 24, 1925. Serial No. 77,462.

This invention relates to certain improvements in apparatus for packing fruit in preparation for storage or transportation.

It is well-known that in packing fruit such as apples, peaches, pears and the like in suitable baskets and analogous receptacles it is customary to use the most select fruit of its kind and to arrange this selected fruit in as symmetrical and attractive manner as possible as the top layer within the receptacle while the remainder of the fruit within the receptacle may be more or less promiscuous in its arrangement from the bottom to the top layer.

The common practice is to place one layer of the selected fruit in a symmetrical and attractive relation upon a temporary horizontal support (usually circular) in such manner that the marginal row will be slightly within the marginal edge of the support and then to place a reinforced conical retaining ring over and upon the marginal edges of the support around said layer and afterward to fill the cone more or less promiscuously from the top downwardly with fruit of the same kind until the cone is filled to the level of its top or upper smaller end.

When the cone is filled in the manner described, the outer reinforcing part thereof is removed by hand by upward displacement and the basket into which the fruit is to be placed for storage or transportation is then placed in an inverted position over the inner lining which serves to retain the fruit in place after the outer reinforcing member has been withdraw and while the basket is being placed over and upon the inner lining.

Following this latter operation the temporary support for the selected layer of fruit together with the remaining portion of the fruit within the inner lining and the basket are inverted so as to bring the basket with the fruit therein right side up.

The temporary support for the selected layer of fruit is then removed and the top of the basket covered with the usual closure to retain the fruit therein ready for shipment or storage, it being understood that the inner lining which is usually made of soft cardboard or equivalent cheap material remains in the basket to protect the fruit from injury by contact with the walls of the basket.

The inversion of the filled baskets from their filling positions to their normal upright positions is quite laborious and requires strong men for that purpose and the main object of the present invention is to provide means whereby this operation may be more conveniently and expeditiously carried out with less labor and expense than has heretofore been practised.

In other words, I have sought to provide a fruit packing device which may be more expeditiously operated by a cheaper class of labor such as boys or girls than has heretofore been practised.

Another object is to provide means whereby the fruit may be caused to settle down into more compact space during the process of packing without affecting the symmetrical arrangement of the selected layer.

Other objects and uses relating to specific parts of the apparatus will be brought out in the following description.

In the drawings:

Figure 1 is a perspective view of the apparatus forming the subject matter of my invention omitting the fruit receptacles.

Figure 2 is a plan of the detached temporary support for the selected layer of fruit.

Figure 3 is a perspective view of the detached reinforcing shell for the inner conical lining.

Figure 4 is a detail sectional view of a portion of one side of the fruit receiving and supporting device showing the means for locking and releasing the outer reinforcing shell upon and from the marginal edge of the temporary support for the selected layer of fruit.

Figure 5 is a longitudinal vertical sectional view taken on line 5—5, Figure 1.

Figure 6 is a sectional view similar to Figure 5 except that the lower portion of the main supporting frame is broken away, the outer reinforcing shell removed from the inner lining and the basket placed in operative position upon the marginal edge of the temporary support for the selected layer, the fruit supposed to be packed within the inner lining and upon the temporary bottom being omitted, the dotted lines indicating the position of the filled basket after being inverted from its filling position to its normal upright position.

As illustrated this apparatus comprises a main supporting frame —1— of wood or any other suitable material having a substantially horizontal top composed of side rails —2— and end rails —3— and —3'— arranged so as to form an intervening rectangular opening.

The top or work-table of the frame —1— is approximately the same width as the diameter of the basket into which the fruit is to be packed while the length of said top is approximately twice that of the diameter of the basket to allow both ends to be used at the same time, one for filling the receptacle and placing the covers on the filled receptacles.

A pair of brackets —4— are secured to and extend upwardly from the central portions of opposite side rails —2— of the main supporting frame in transversely spaced relation approximately equal to the width of the frame or opening between the said rails —2—, the height of said brackets being equal to approximately one-half of the height of the basket or other receptacle to be filled so as to enable the basket to assume about the same horizontal place in both its inverted and reverted positions.

The upper ends of the brackets —4— are connected by a cross shaft —5— which forms a journal bearing for a pair of swinging frames or levers —6— and —7—, both of which are substantially L-shaped longitudinally and the ends of their shorter arms journaled side by side upon the shaft —5— coaxial therewith.

The length of the shorter arms of the swinging frames —6— and —7— is substantially equal to the distance from the shaft —5— to the upper edges of the side rails —2— and end rails —3— and —3'— while the length of the longer arms of both swinging frames is somewhat greater than the distance between the vertical plane of the shaft —5— and outer ends of the main frame —1— so as to normally rest upon the upper edges of their respective end rails —3'— and —3— when extended longitudinally, under which conditions the longer arms of the swinging frames will lie in substantially the same horizontal plane while their shorter arms will be disposed in substantially the same vertical plane as shown in Figures 1 and 5.

The upper edges of the end rails —3— and —3'— are provided with recesses —8— and —8'— of substantially the same depth as the thickness of the adjacent portions of their corresponding frames —7— and —6— to permit the longer arms of said swinging frames to normally lie in a horizontal plane slightly below the upper edges of the side walls.

For clearness of description the swinging frame —7— may be termed the carrier lever for the reason that it carries the container during the packing operation while the other frame —6— may be termed the clamping lever by reason of its function of holding the filled container upon the supporting carrier lever during the inversion of said carrier lever from its filling position to its position as shown by dotted lines in Figure 6.

The longer arm of the lever —7— is preferably Y-shaped with its shorter arm forming the terminal ends of the branches of the Y and its stem normally extending beyond the corresponding end rail —3— to form a handle by which the lever may be operated and also to form an anchorage for receiving a suitable tie member —a— whereby the free ends of the levers may be connected to each other in the manner shown in Figure 6.

A ring —9— is secured by rivets or other fastening means to the upper face of the lever —7— to extend upwardly therefrom for receiving and supporting the marginal edges of a metal disk or tray —10— which may be removably secured upon the upper edge of the ring —9— to permit the interchange of different forms of trays according to the size or nature of the fruit to be packed.

As illustrated, the disk —10— is provided with circular concentric corrugations forming alternate circular ribs and troughs for receiving the selected fruit which is arranged symmetrically in the troughs in close proximity to render the top layer of the fruit more attractive when packed in a manner presently described.

The marginal edge of the disk —10— extends beyond the ring —9— to form an annular ledge —11— for receiving and supporting the larger ends of an inner conical lining —12— and an outer reinforcing shell —13— which is also conical and adapted to fit closely upon the perimeter of the inner lining —12— for holding said lining against spreading while the fruit is being packed therein.

The inner and outer shells —12— and —13— are preferably of the same height, the inner shell being usually made of cardboard or similar cheap material into which the fruit is directly placed during the packing operation, both shells being open at the top and bottom to permit the passage of fruit therethrough onto the temporary supporting tray —10—.

In preparing for the packing of the fruit in a basket or equivalent receptacle the inner lining —12— is first placed in an upright position with its lower larger end resting on the marginal ledge —11— of the temporary bottom —10— after which the reinforcing shell —13— is placed over and upon the lining —12— with its lower larger end also resting on the ledge —11—.

The selected fruit to form the top layer of the main receptacle is then placed by hand through the upper open end of the shells —12— and —13— upon the temporary bottom —10— so as to lie side by side in juxtaposition in the annular grooves of the disk after which additional fruit of the same kind is placed in the inner receptacle through the open top thereof until the latter is filled.

During this filling operation it is desirable to slightly agitate the fruit to cause it to settle into more compact space and, if necessary, to allow additional fruit to be added to fill the receptacle and for this purpose is provided a vertical movable tappet or plunger —14— having its upper end guided in a suitable bracket —15— and adapted to engage a contact plate on the underside of the lever —7— as shown in Figure 5, the lower end of said tappet or plunger —14— being pivotally connected to the inner end of a pedal lever —17— which is fulcrumed on the main supporting frame —1— and adapted to be operated by the foot of the user to operate the plunger —14— intermittingly against the underside of the lever —7— and thereby to agitate and settle the fruit within the inner receptacle —12—.

During this agitation of the carrier lever —7— and container mounted thereon, the shells —12— and —13— are held against upward displacement by one or more detents —16— which are pivoted at —18— to a bracket or brackets —13'— on the outer shell —13— and are movable into and out of engagement with the marginal edge of the tray —10— as shown in Figure 4 and are adapted to be tripped at will by one or more hand-operated slides —16'— carried by the shell —13— as shown in Figure 3.

When the inner shell —12— is filled in the manner described, the detent —16— is tripped and the outer reinforcing shell —13— is removed and replaced by a basket —A— which is inverted and placed over and upon the periphery of the lining shell —12— as shown by full lines in Figure 6.

The clamping lever —6— is then adjusted across the bottom of the basket and secured by means of a cord or cable —a— to the free end of the lever —7— thereby firmly holding the filled container between the two levers.

The lever —7— is then rocked upwardly and laterally by hand to the opposite side of the supporting shaft —5— thereby restoring the filled basket to its normal upright position with the clamping lever —6— resting upon the top of the frame and the carrier lever —7— extending across the top of the basket and its tray —10.—

The cord or tie member —a— is then loosened from engagement with the free end of the lever —7— to permit the return of said lever with the ring —9— and tray —10— thereon to their filling positions leaving the filled basket still resting upon the top of the frame —1— in substantially the same horizontal plane as when filling.

The usual cover for the basket may then be placed in operative position across and upon the open end of the basket for retaining the fruit therein whereupon the basket with the fruit therein may be removed by hand or otherwise for storage or transportation, the parts of the packing device being then in position for a repetition of the packing operation previously described.

What I claim is:

1. In a fruit and vegetable packing apparatus, a supporting lever for the container of the articles to be packed, and a clamping lever for holding the container on the supporting lever, both levers being hinged to swing about a common axis from positions at one side to positions at the opposite side of said axis and having their container-supporting portions offset substantially equal distances from said axis.

2. In a fruit packing apparatus, a frame, a pair of opposed levers hinged to the frame to swing about a fixed axis to opposite sides of said axis for supporting a container for the fruit between them, the hinged ends of said levers being offset substantially equal distances from the main portions thereof.

3. In a fruit packing apparatus, a frame, a pair of opposed levers hinged to the frame to swing about a fixed axis to opposite sides of said axis for supporting a container for the fruit between them, both of said levers being L-shaped longitudinally to enable the container to be supported in substantially the same horizontal plane at both sides of said axis.

In witness whereof I have hereunto set my hand this 15th day of December, 1925.

ALBERT B. CLISSON.